(12) United States Patent
Shen

(10) Patent No.: US 8,182,897 B2
(45) Date of Patent: May 22, 2012

(54) 15 FOLDING SECTION MATERIAL

(76) Inventor: Suizhang Shen, Tianjin (CN)

( * ) Notice: Subject to any disclaimer, the term of this patent is extended or adjusted under 35 U.S.C. 154(b) by 424 days.

(21) Appl. No.: 12/445,460

(22) PCT Filed: Dec. 13, 2007

(86) PCT No.: PCT/CN2007/003578
§ 371 (c)(1),
(2), (4) Date: Apr. 14, 2009

(87) PCT Pub. No.: WO2009/052667
PCT Pub. Date: Apr. 30, 2009

(65) Prior Publication Data
US 2010/0178455 A1    Jul. 15, 2010

(30) Foreign Application Priority Data
Oct. 26, 2007    (CN) .......................... 2007 1 0060034

(51) Int. Cl.
*H02B 1/01* (2006.01)
*H02B 1/30* (2006.01)
*H05K 7/18* (2006.01)

(52) U.S. Cl. .................... 428/134; 428/131; 312/265.1; 312/265.3; 312/265.4; 312/257.1

(58) Field of Classification Search .................. 428/131, 428/134; 52/660; 312/265.1, 265.3, 265.4, 312/257.1
See application file for complete search history.

(56) References Cited

U.S. PATENT DOCUMENTS

| | | | |
|---|---|---|---|
| 6,190,081 B1 * | 2/2001 | Besserer et al. | 403/231 |
| 6,273,533 B1 * | 8/2001 | Nicolai et al. | 312/265.1 |
| 2004/0007950 A1 * | 1/2004 | Holighaus et al. | 312/265.3 |

* cited by examiner

*Primary Examiner* — David Sample
*Assistant Examiner* — Nathan Van Sell
(74) *Attorney, Agent, or Firm* — Hiroe & Associates; Dwayne L. Bentley

(57) ABSTRACT

A fifteen (15) folding section material having a column shaped framework with mounting holes. The framework further comprises intersecting surfaces which form a closed symmetric figure with opening holes. Two pairs of symmetrical planks of the framework are fitted with mounting holes distributed evenly in a longitudinal direction. The fifteenth and final fold forms three (3) layers. The fifteen (15) folding section framework allows a cabinet fitted with doors opening at four sides.

2 Claims, 1 Drawing Sheet

Fig. 1
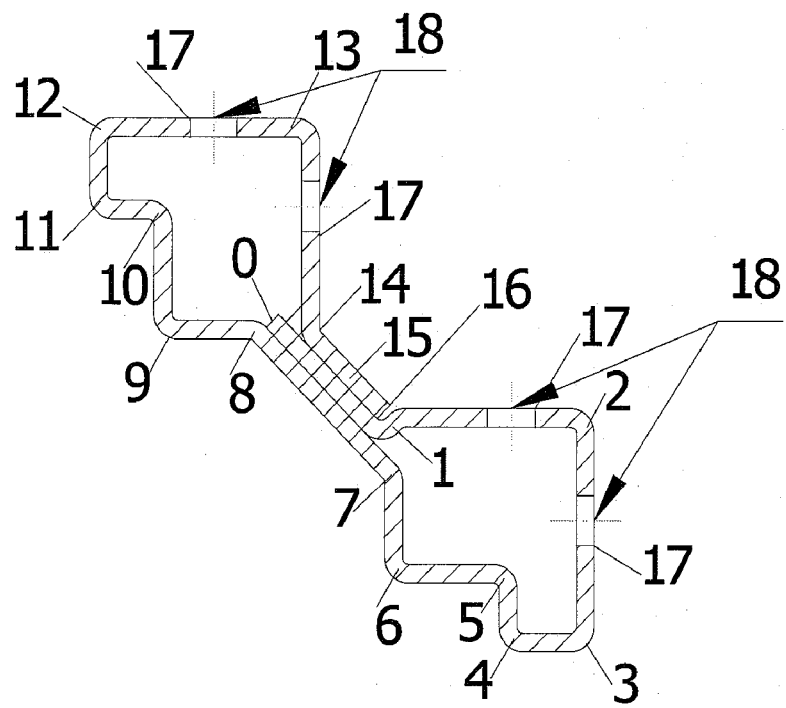
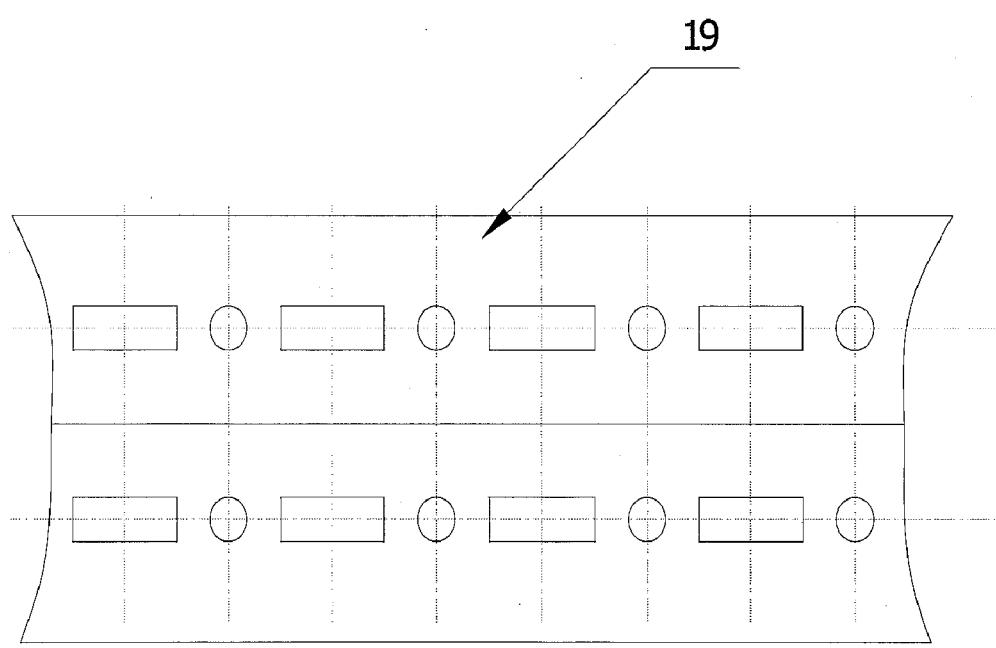
Fig. 2

15 FOLDING SECTION MATERIAL

TECHNICAL FIELD

This invention belongs to the technical field of metal-made hollow section materials. It introduces a 15 folding section material, which is especially applicable to low voltage cabinets.

TECHNICAL BACKGROUND

Following the development of application and security technologies in the field of low voltage distribution industry, requirements on section materials for cabinet are becoming more and more critical. On one hand, it is expected that the material can be functionalized; on the other hand, it is required that it can meet the standards of mechanical strength, rigidity and protection grade. Due to the above mentioned reasons, current cabinet section materials have gradually changed from former 8MF to 9 folding and 16 folding profiles.

The 16 folding profile, which makes up the defects of 9 folding profile, enables doors of a cabinet to open at four directions and decreases the overall weight of the cabinet body. However, it is thinner and requires reinforcement for a higher cabinet. It is thus the market expects a new section material that could change and best fit for the main framework of a cabinet.

CONTENT OF INVENTION

This invention overcomes many disadvantages in current technologies and offers a 15 folding section material, which adopts a 3-layer-folding technique at the $15^{th}$ fold and enables standardization of a cabinet, including high intensity, light weight and etc. The cabinet could fit with doors at its four sides and meet the requirements of rigidity and protection grade. Thus, the material has a wide range of application scope for various cabinets.

This invention adopts the below mentioned solution to solve the technical problems:

A 15 folding section material is offered in accordance with this invention. It consists of a framework with mounting holes. The mentioned framework (19) is in a shape of column, with the intersection surface of a closed symmetric figure of 15 folds with opening holes. Two pairs of symmetrical planks (17) of the framework are fitted with mounting holes (18); The 15 folds symmetrical closed figure of the intersection surface starts from the start point (0), extends 45 degrees lower rightward and then make the first fold (1) 135 degrees rightward, downward 90 degrees for the $2^{nd}$ fold (2), 90 degrees leftward for the $3^{rd}$ fold (3), upward 90 degrees for the $4^{th}$ fold (4), 90 degrees leftward for the $5^{th}$ fold (5), 90 degrees upward for the $6^{th}$ fold (6), 45 degrees upper leftward for the $7^{th}$ fold (7), 135 degrees leftward for the $8^{th}$ fold (8), 90 degrees upward for the $9^{th}$ fold (9), 90 degrees leftward for the $10^{th}$ fold (10), 90 degrees upward for the $11^{th}$ fold (11), 90 degrees rightward for the $12^{th}$ fold (12), 90 degrees downward for the $13^{th}$ fold (13), 45 degrees lower rightward for the $14^{th}$ fold and close the three-layered plate to form the $15^{th}$ fold (15) to end the materials at the ending point (16); The $2^{nd}$ fold (2), $3^{rd}$ fold (3), $4^{th}$ fold (4), $5^{th}$ fold (5), $6^{th}$ fold (6) and $7^{th}$ fold (7) are symmetric with $13^{th}$ fold (13), $12^{th}$ fold (12), $11^{th}$ fold (11), $10^{th}$ fold (10), $9^{th}$ fold (9) and $8^{th}$ fold (8) respectively.

This invention adopts the below mentioned technical solution to further solve the technical problems:

The above mentioned mounting holes have an alternation of round and rectangular shape distributing evenly along the framework in a longitudinal direction.

Outstanding advantages and benefits of this invention compared with current technologies:

Comparing with 16 folding section material, this invention is featured by the increasing of strength due to the adoption of 3-layer-folding technique at the $15^{th}$ fold. A cabinet made of this material boasts excellent appearance, light weight, high strength, easy electric maintenance and wide application scope. It could solve almost all problems in longitudinal, latitudinal and 45 degrees installations. A symmetric framework enables doors to open at four directions and random assembly from the front, back, left, right and at 45 degrees.

For detailed implementation of this invention, refer to following description and attached figures.

NOTES TO ATTACHED FIGURES

FIG. 1 is a sketch of the cross section structure of a 15 folding section material;

FIG. 2 is a sketch of longitudinal distribution of mounting holes of a 15 folding section material.

DETAILED DESCRIPTION ON IMPLEMENTATION

The following description explicates specific ways of implementation, the structure, features and efficacy of this invention with the assistance of attached figures and preferred embodiment.

A 15 folding section material is shown in FIGS. 1 and 2. It consists of a frame-work with mounting holes. The mentioned framework (19) is in a shape of column, with the intersection surface of a closed symmetric figure of 15 folds with opening holes. Two pairs of symmetrical planks (17) of the framework are fitted with mounting holes (18). The holes have an alternation of round and rectangular shape distributing evenly along the framework in a longitudinal direction. The center distance of round/rectangular hole is: L=25 mm. The 15 folds symmetrical closed figure of the intersection surface starts from the start point (0), extends 45 degrees lower rightward and then make the first fold (1) 135 degrees rightward, downward 90 degrees for the $2^{nd}$ fold (2), 90 degrees leftward for the $3^{rd}$ fold (3), upward 90 degrees for the $4^{th}$ fold (4), 90 degrees leftward for the $5^{th}$ fold (5), 90 degrees upward for the $6^{th}$ fold (6), 45 degrees upper leftward for the $7^{th}$ fold (7), 135 degrees leftward for the $8^{th}$ fold (8), 90 degrees upward for the $9^{th}$ fold (9), 90 degrees leftward for the $10^{th}$ fold (10), 90 degrees upward for the $11^{th}$ fold (11), 90 degrees rightward for the $12^{th}$ fold (12), 90 degrees downward for the $13^{th}$ fold (13), 45 degrees lower rightward for the $14^{th}$ fold and close the three-layered plate to form the $15^{th}$ fold (15) to end the materials at the ending point (16); The $2^{nd}$ fold (2), $3^{rd}$ fold (3), $4^{th}$ fold (4), $5^{th}$ fold (5), $6^{th}$ fold (6) and $7^{th}$ fold (7) are symmetric with $13^{th}$ fold (13), $12^{th}$ fold (12), $11^{th}$ fold (11), $10^{th}$ fold (10), $9^{th}$ fold (9) and $8^{th}$ fold (8) respectively.

I claim:

1. A fifteen folding section material comprising:
    a framework having two pairs of symmetrical planks (17) fitted with mounting holes (18);
    the framework folded in fifteen sections;
    the folded framework (19) having a column shape, wherein when the framework is folder there is formed, with intersecting surfaces, a substantially closed symmetrical figure, and wherein the fifteen fold closed symmetrical figures starts from a starting point (0), extends substantially 45 degrees lower rightward and then makes a first fold (1), extends substantially 135 degrees rightward then extends substantially 90 degrees downward for a second fold (2), extends substantially 90 degrees leftward for a third fold (3), extends substantially upward 90 degrees for a fourth fold (4), extends substantially 90 degrees leftward for a fifth fold (5), extends substantially 90 degrees upward for a sixth fold (6), extends substantially 45 degrees upper leftward for a seventh fold (7), extends substantially 135 degrees leftward for an eighth fold (8), extends substantially 90 degrees upward for a ninth fold (9), extends substantially 90 degrees leftward for a tenth fold (10), extends substantially 90 degrees upward for an eleventh fold (11), extends substantially 90 degrees rightward for a twelfth fold (12), extends substantially 90 degrees downward for a thirteenth fold (13), extends substantially 45 degrees lower rightward for a fourteenth fold (14), and closes forming a three-layered plate to form a fifteen fold (15) to end the material at an ending point (16), and wherein the second fold (2), the third fold (3), the fourth fold (4), the fifth fold (5), the sixth fold (6), and the seventh fold (7) are symmetric with the thirteenth fold (13), the twelfth fold (12), the eleventh fold (11), the tenth fold (10), the ninth fold (9), and the eighth fold (8) respectively; and the three-layered plate comprising the substantial overlap of sections comprising the section from the starting point (0) to the first fold (1), the section from the seventh fold (7) to the eighth fold (8), and the section from the fourteenth fold (14) to the ending point (16), wherein the section from the starting point (0) to the first fold (1) is substantially sandwiched between the section from the seventh fold (7) to the eighth fold (8) and the section from the fourteenth fold (14) to the ending point (16).

2. The fifteen folding section of claim 1, wherein the mounting holes (18) are substantially evenly distributed along the framework in a longitudinal direction, and wherein said mounting holes (18) are formed so as to have an alternation of round shaped and rectangular shaped mounting holes (18).

* * * * *